No. 883,321. PATENTED MAR. 31, 1908.
B. F. LINDEMAN.
NAIL PULLER AND STARTER.
APPLICATION FILED FEB. 16, 1907.
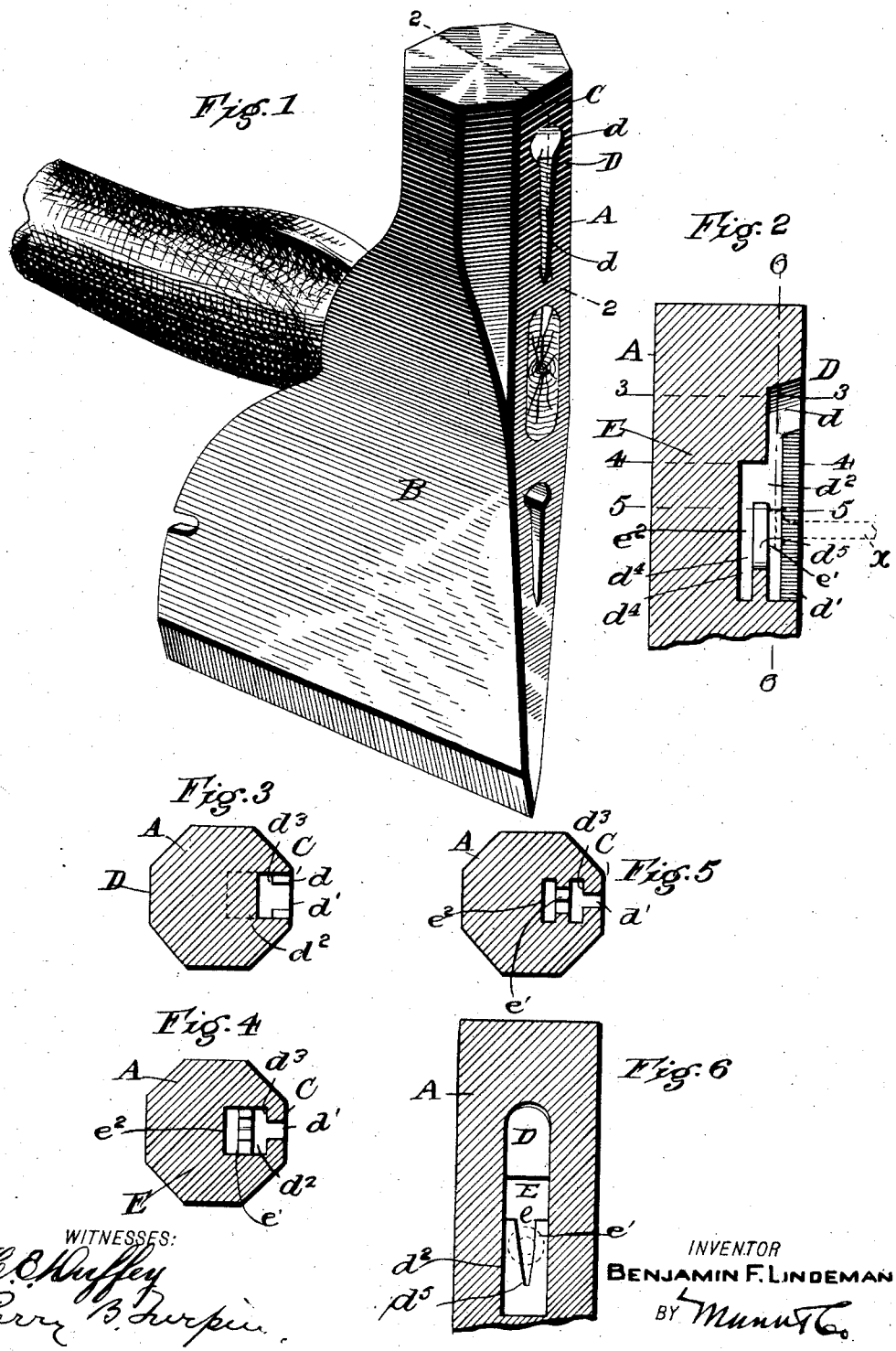
INVENTOR
BENJAMIN F. LINDEMAN
BY Munn & Co.
ATTORNEYS

UNITED STATES PATENT OFFICE.

BENJAMIN F. LINDEMAN, OF McKEES ROCKS, PENNSYLVANIA, ASSIGNOR OF THREE-EIGHTHS TO RUTHERFORD HAYES CLEVER, OF McKEES ROCKS, PENNSYLVANIA.

NAIL PULLER AND STARTER.

No. 883,321.  Specification of Letters Patent.  Patented March 31, 1908.

Application filed February 16, 1907. Serial No. 357,635.

*To all whom it may concern:*

Be it known that I, BENJAMIN F. LINDEMAN, a citizen of the United States, and resident of McKees Rocks, in the county of Allegheny and State of Pennsylvania, have made new and useful Improvements in Nail Pullers and Starters, of which the following is a specification.

My invention is an improvement in nail pullers, and nail setters or starters, being designed especially for embodiment in hammers and hatchets; and the invention consists in certain novel constructions and combinations of parts as will be hereinafter described and claimed.

In the drawing, Figure 1 is a perspective view of a hatchet provided with my improvements. Fig. 2 is a detail longitudinal section of the head on about line 2—2 of Fig. 1. Fig. 3 is a cross section on about line 3—3 of Fig. 2. Fig. 4 is a cross section on about line 4—4 of Fig. 2. Fig. 5 is a cross section on about line 5—5 of Fig. 2; and Fig. 6 is a longitudinal section on about line 6—6 of Fig. 2.

As suggested, my invention is especially adapted for use in connection with hammering tools, such for instance as hammers proper and hatchets, and, as shown in Fig. 1, I may apply the invention in connection with the poll end or head A, as well as in connection with the blade B.

The improvement being designed to provide a nail starter as well as a puller will be found especially useful in places such as corners and the like where it is only convenient to work with one hand.

By preference, the head A is octagonal. This form is preferred because by having the head or butt end in the form of an octagon, nails can be pulled from almost any position or angle.

The tool is recessed on its face at C, the recess D having its outer end in the form of a key hole slot with the enlarged entering portion $d$ and the tapered slot or wing $d'$ leading therefrom and gradually decreasing in width as it departs from the enlarged entering portion $d$ as shown. The enlarged entering portion $d$ is of such size as to permit receiving the head of ordinary nails, and lateral grooves $d^2$ are formed leading from the enlarged entering portion $d$ in rear of the tapered slot $d'$ and forming an under-cut portion back of said tapered slot or wing $d'$ for receiving the head of a nail after it has been inserted in the opening $d$ and its shank slipped along the tapered slot or wing $d$.

The opposite edges of the slot are roughened to give a better friction hold on the nail.

In Fig. 2 a nail $x$ is shown by dotted lines as wedged between the sides of slot $d'$, and in due position for extraction, its flanged head being in the recess $d^2$ provided in rear of the slot $d'$. In the extracting pull, of course the flange of the nail head engages the under-cut inner sides or shoulders $d^3$, of the slotted portion; see Figs. 3, 4 and 5.

The nail may also be held in the same position for setting or starting it, the flat portion of the head in such case abutting the back wall of the recess.

In some cases I may provide a second recess $d^4$ in rear of the first one $d^2$, the portion $d^5$ that intervenes the two recesses being a short partition having a tapered notch as shown in Fig. 6, into which a nail may be wedged as in the outer slot $d'$. It is obvious that a nail would be held more firmly in the two slots, than in the outer one alone. In setting a nail its head may abut the rear wall of the inner recess or the partition $d^5$, as preferred.

Having thus described my invention, what I claim as new and desire to secure by Letters Patent is—

1. The improved tool herein described, provided with a key-hole opening in its face having an enlarged entering portion, a tapered slot or wing leading therefrom, and having an internal groove or recess forming an undercut portion leading from the enlarged entering portion in rear of the tapered slot or wing, and also provided with a head receiving opening intersecting the under-cut groove or recess and arranged out of alinement with the enlarged entering portion opening at the face of the tool, and having a tapered slot and an under-cut groove or recess leading from said inner head receiving opening, all substantially as and for the purposes set forth.

2. The tool substantially as herein described, having an octagonal head and provided with the key-hole slot in the face thereof and having an enlarged entering portion and a slot or wing leading therefrom, and also having in rear of said slot or wing an under-cut portion or recess communicating with the enlarged entering portion, substantially as and for the purposes set forth.

3. A nail puller and starter comprising a body having an outer undercut opening forming a nail pulling recess and an inner under-cut opening in communication with the outer one and forming a seat for a nail in setting or starting the same, substantially as set forth.

BENJAMIN F. LINDEMAN.

Witnesses:
  Solon C. Kemon,
  Amos W. Hart.